(No Model.) 2 Sheets—Sheet 1.
R. B. AYRES.
STATION INDICATOR.
No. 467,678. Patented Jan. 26, 1892.
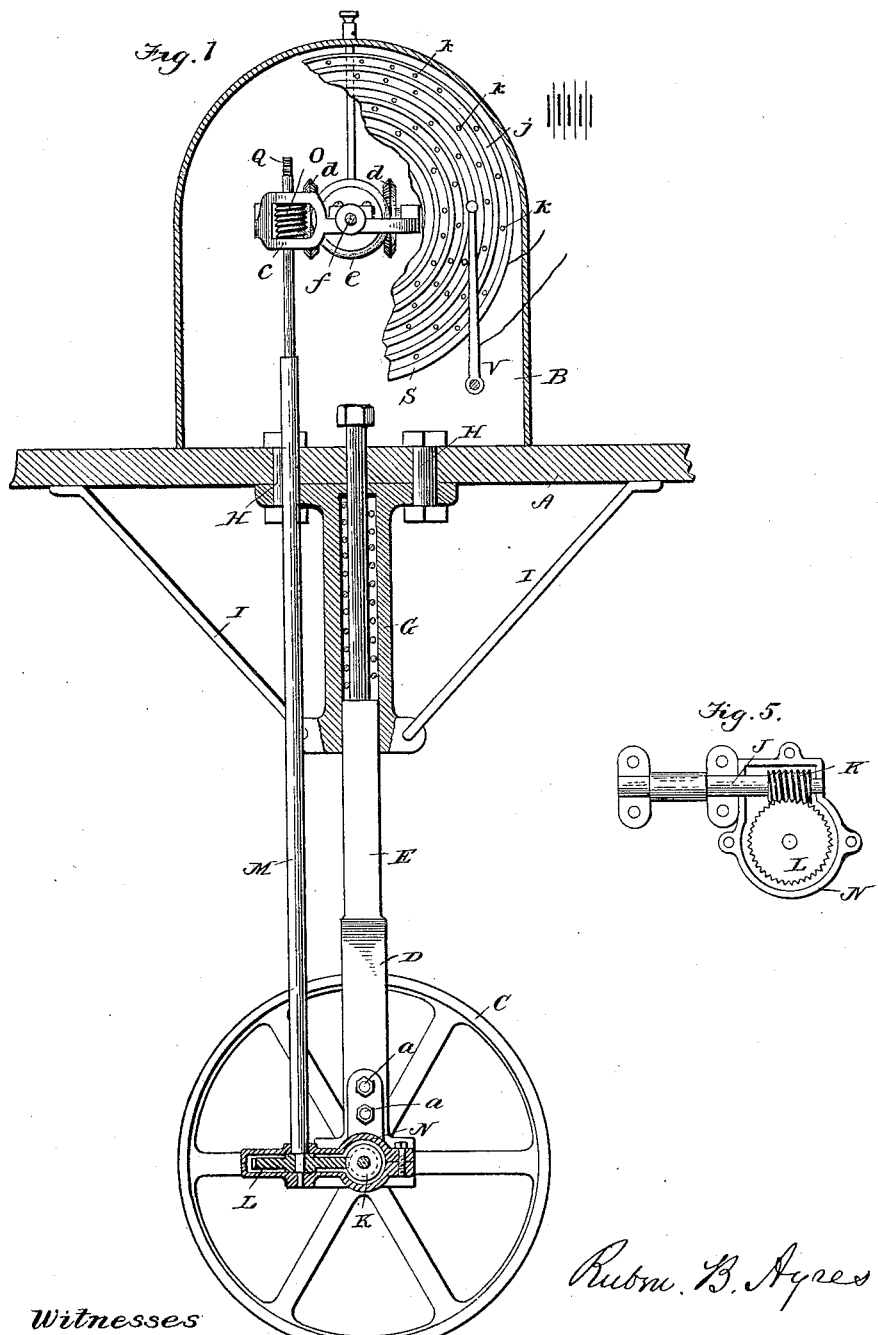

(No Model.) 2 Sheets—Sheet 2.
R. B. AYRES.
STATION INDICATOR.
No. 467,678. Patented Jan. 26, 1892.
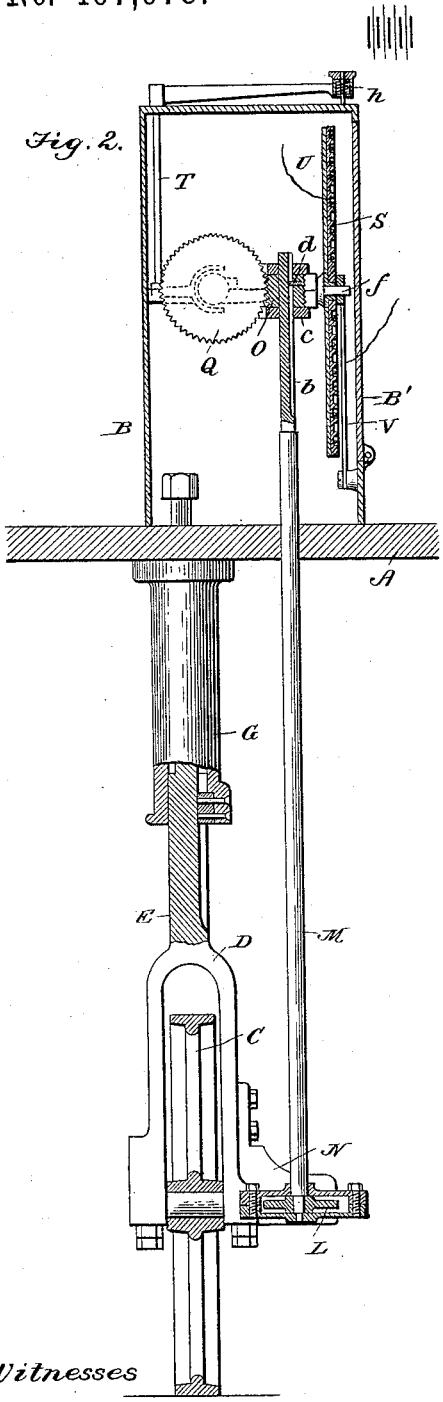
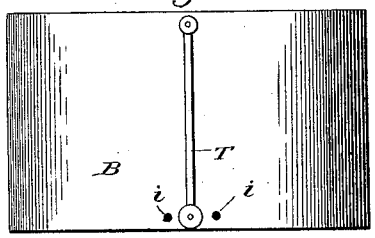
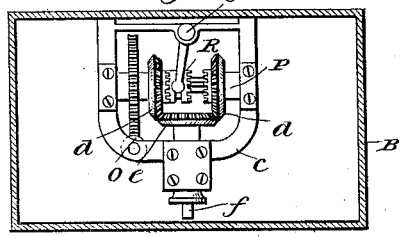
Witnesses
Edwin L. Bradford
E. Everett Ellis
Ruben B. Ayres
Inventor
By Wm C. W. Intire
Attorney

UNITED STATES PATENT OFFICE.

RUBEN B. AYRES, OF NEW YORK, N. Y.

STATION-INDICATOR.

SPECIFICATION forming part of Letters Patent No. 467,678, dated January 26, 1892.

Application filed July 27, 1891. Serial No. 400,814. (No model.)

*To all whom it may concern:*

Be it known that I, RUBEN B. AYRES, a citizen of the United States, residing at New York, in the county of New York and State of New York, have invented certain new and useful Improvements in Station-Indicators; and I do hereby declare the following to be a full, clear, and exact description of the invention, such as will enable others skilled in the art to which it appertains to make and use the same.

This invention relates to certain new and useful improvements in electrical street or station indicators; and it consists, substantially, in such features of arrangement, construction, and combination of parts, as will hereinafter be more particularly described, and pointed out in the claims.

The invention has reference more particularly to that class of electrical street or station indicators in which the operative mechanism is located within the car and is set in motion by means of suitable connections with a trail or measuring wheel which travels over the track-rails in like manner as the wheels upon which the body of the car is supported and carried.

The object of the invention is to simplify the connections between the trail or measuring wheel and the indicating mechanism proper, and also to insure more perfect or accurate indications of the several streets or stations in their successive order.

A further object is to provide for the quick and ready reversal of action of the circuit-closing disk, whereby the several streets or stations will be correctly indicated in reverse order on the back or return trip of the car, substantially as will more fully hereinafter appear when taken in connection with the accompanying drawings, wherein—

Figure 1 represents a vertical sectional elevation of a device constructed and arranged in accordance with my invention, the said figure clearly illustrating the manner of working the several parts. Fig. 2 is a similar view taken transversely to the preceding figure and more clearly indicating the construction of certain parts. Fig. 3 is a horizontal section of the metallic housing or casing, showing the interior mechanism in plan. Fig. 4 is a top view of the housing or casing which incloses the indicating mechanism proper; and Fig. 5 is a view in detail of the worm-gear, through the medium of which the vertically-operating shaft receives its motion from the shaft which carries the trail or measuring wheel.

In carrying my invention into effect I employ a suitable metallic housing or casing for the several main operating parts and which I locate, preferably, beneath the seat at one end of the car, so as to bring its interior mechanism in line with the vertical shaft which receives its motion from the shaft of the trail or measuring wheel. The said trail or measuring wheel has its bearing in a fork which extends upward and has its stem passed loosely through the bottom of the case, so that on encountering an obstruction to the wheel the said fork will be lifted upward and the operative mechanism thereby protected from injury or disarrangement. Surrounding the stem of the fork is a spiral spring which is inclosed by a sleeve or tube, up through which the said stem also passes, the said sleeve or tube being supported from the bottom of the car by means of suitable screws and stay-rods, so as to preserve the same in line. The use of the spiral spring is to constantly exert a downward pressure upon the two branches of the fork and thereby maintain the measuring-wheel in contact with the track-rail, as well, also, as to counteract any slight upward pressure on the wheel during the travel of the car. As before indicated, should any unusual obstruction to the measuring-wheel be encountered the action of the spring will be overcome and the wheel will be lifted entirely free from the track without injury to the operating mechanism located within the car above; but at all other times the spring will serve to keep the wheel down upon the track, so as to move upon every inch of surface thereof and cause the rotating circuit-closing disk to turn the required distance between stations.

The shaft of the measuring or trail wheel is formed or provided with a worm which meshes with a gear-wheel secured to the lower end of an upright or vertical shaft, and the said worm and gear wheel are both inclosed in a hollow bracket secured to the side of the fork, by which protection from the weather is had and the parts prevented from clogging with dirt.

The upright or vertical shaft referred to has its lower bearings in the bottom of the hollow bracket and extends up through the bottom of the car to a suitable height within the metallic house or casing. As the measuring-wheel travels the surface of the track-rail, the said shaft will be rotated in an obvious manner. The upper end of the upright shaft passes through a hollow worm gear or sleeve that is supported by and is free to turn within a suitable frame, so that by keying this worm sleeve or gear to the said shaft the said sleeve will turn with the shaft as the latter is rotated. The shaft is provided with a kerf or groove for a suitable distance from its upper end, and engagement with the hollow worm gear or sleeve is effected by passing a pin through the latter and causing it to enter the groove. In this way the shaft will be free to move up and down, so as to conform to any rise and fall which may be imparted to the wheel-fork and at the same time the worm-sleeve will turn with the shaft. If no provision were made for the rise and fall of this shaft, the entire mechanism inclosed within the matallic house or casing would become disarranged and perhaps broken should the wheel be suddenly lifted very high from the track-rail.

Supported within the metallic housing or casing is a small horizontal shaft, on which is arranged or secured a gear-wheel which meshes with the worm-sleeve on the upper end of the vertical shaft, and loosely held upon said horizontal shaft are two beveled gear-wheels which are adapted to be engaged by a sliding clutch which is feathered to said shaft and works between the two beveled gear-wheels. These wheels are in engagement with a corresponding gear-wheel carried on the end of a small shaft which carries the circuit-closing disk, and accordingly as the one or the other of said loose wheels is engaged by the clutch the direction in which the disk is moving will be reversed. In this way the several streets or stations will be correctly indicated in reverse order on the return trip of the car. The clutch is shifted or operated by means of a crank or lever, one arm of which extends over the top of the casing and is provided with a spring locking-pin which enters openings in the top of said casing, so as to hold the clutch to whichever position it may be shifted.

The circuit-closing disk is of rubber or other non-conducting material having a scroll or spiral groove in the face thereof, and is provided with a backing of metal or other conducting material, the said disk being supported by the small shaft hereinbefore referred to, and is made to turn in either direction, accordingly as one or the other of the loose gears is engaged by the clutch. The said disk moves very slowly as the trail or measuring wheel moves upon the track-rail, and at distances apart (previously calculated) to correspond with the several streets or stations pins are forced through the bottom of the spiral groove, so as to come in contact with the metallic backing. A lever of conducting material is pivoted on the inner side of the casing and has its end working in the groove of the disk, so as to form electrical contact with the pins, each one of which latter represents a street or station. As the disk turns, the pins come in contact with the lever, and by the use of a suitable battery and wire connections a closed electric circuit will be established and made to operate an annunciator or other usual indicator which may be located within the car in sight of the passengers. The electric circuit may be established between the disk-backing and the contact-lever through wires leading to the indicator.

Reference being had to the several parts of the drawings by the letters marked thereon, A represents the bottom of the car, and B the metallic housing or casing for inclosing the main operating parts, the same having the door B'.

C represents the trail or measuring wheel, which moves upon the surface of the track-rail and which has its bearings in the fork D, the stem E of which fork extends up and passes loosely through the bottom of the car, as shown.

F represents the spiral spring, which surrounds the stem of the fork and which serves by its pressure upon the latter to maintain the wheel down upon the track and cause it to move over every inch of surface thereof. The said spring is inclosed within a tube or sleeve G, depending from the bottom of the car and secured in place by screws H H and stay-rods I I.

The shaft J of the measuring-wheel is formed or provided with a worm K, which meshes with the gear-wheel L, carried on the lower end of the vertical shaft M, and both this wheel and worm are inclosed and protected from the weather by a hollow bracket N, which is formed of two parts, as shown, and which is supported from the side of the fork by screws or bolts $a\ a$.

The upright or vertical shaft M is grooved for a suitable distance from its upper end, as seen at $b$, and such end passes through a hollow worm gear or sleeve O, which is supported by and is free to turn within a frame C, which may be supported within the casing B in any suitable manner. By passing the pin $d$ (see Fig. 2) through the worm sleeve or gear O and causing it to enter the groove $b$ of the shaft the said gear O will be caused to turn as the shaft is rotated from the wheel-shaft.

Having its bearings in the frame $c$ is a small horizontal shaft P, on which is loosely held the beveled gear-wheels $d\ d$, and keyed to said shaft is a gear-wheel Q, which meshes with the worm-sleeve through which the upper end of the vertical shaft passes. The beveled wheels *d* are adapted in their inner faces to be engaged by a clutch R, which is feathered to the shaft P and slides thereon lengthwise, and accordingly as one or the other of said wheels is engaged by the clutch such wheel so engaged will be made to turn with the shaft P. The said wheels are for the purpose of engaging with a similar wheel *e*, that is fast upon the inner end of the small shaft *f*, which has its bearing in the frame *c* and on the other end of which the circuit-closing disk S is held or supported. By clutching one of the wheels *d* the shaft *f*, as well as its disk S, will be rotated in one direction, and by shifting the clutch so as to engage the other wheel *d* the said shaft and disk will be turned in the opposite direction. The clutch R is operated by means of a crank-lever T, pivoted to the frame *c* at *g*, one arm of which lever extends out over the top of the casing and is provided in its end with a spring locking-pin *h*, which enters holes *i* in the top of the casing to hold the clutch to the positions to which it may be shifted.

The disk S is of rubber or other non-conducting material and is provided with the spiral groove *j*, as shown. Pins *k* are forced through the bottom of the groove, so as to form electrical contact with the metallic backing U of the disk.

V represents the pivoted contact-lever, having its end traversing the groove, so as to come in contact with the pins.

The battery may be located in any convenient place and the course of the electric circuit can be readily traced from the wire connections shown. Instead of a battery, other means may be employed for obtaining the electric circuit; but the description and illustration which I have herein furnished will be fully sufficient to enable the nature and working of my invention to be fully understood.

Having thus described my invention, what I claim as new, and desire to secure by Letters Patent, is—

1. In an electrical street or station indicator, the combination of a spirally-grooved circuit-closing disk having a backing of conducting material and provided in said groove with a series of electrical contact-points, and a movable lever carrying a contact-point which traverses said groove and successively engages the points therein, substantially as described.

2. In an electrical street or station indicator, the combination of a spirally-grooved circuit-closing disk having along its groove a series of electrical contact-points, and a movable lever working in said groove and provided with a contact-point adapted to engage the points in the groove and thereby close an electric circuit for imparting motion to a train of indicating mechanism, substantially as described.

3. In an electrical street or station indicator, the combination, with the spirally-grooved disk of non-conducting material, the same being provided with contact-points on its outer face and a backing of conducting material, of the pivoted contact-lever, means for rotating the disk, and a suitable battery and wire connections, substantially as described.

4. In an electrical street or station indicator, the combination, with the grooved disk, its shaft, and beveled gear-wheel, of the horizontal shaft P, the beveled gears loose on said shaft, the gear Q, the clutch for engaging said loose wheels, the vertical shaft, the worm sleeve or gear on said shaft, the frame for supporting said sleeve, and means for rotating said vertical shaft, substantially as described.

In testimony whereof I affix my signature in presence of two witnesses.

RUBEN B. AYRES.

Witnesses:
R. S. TAYLOR,
E. M. HULSE.